(12) United States Patent
Otsuka

(10) Patent No.: US 10,476,389 B2
(45) Date of Patent: Nov. 12, 2019

(54) SWITCHING POWER SUPPLY APPARATUS

(71) Applicants: Kabushiki Kaisha Toshiba, Minato-ku, Tokyo (JP); Toshiba Electronic Devices & Storage Corporation, Minato-ku, Tokyo (JP)

(72) Inventor: Masafumi Otsuka, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 15/923,422

(22) Filed: Mar. 16, 2018

(65) Prior Publication Data
US 2019/0097535 A1    Mar. 28, 2019

(30) Foreign Application Priority Data

Sep. 22, 2017   (JP) ................................. 2017-182258

(51) Int. Cl.
| | |
|---|---|
| H02M 3/158 | (2006.01) |
| H02M 1/08 | (2006.01) |
| H02M 3/157 | (2006.01) |
| H02M 1/00 | (2006.01) |
| H02M 1/44 | (2007.01) |
| H02M 1/14 | (2006.01) |
| H02M 1/15 | (2006.01) |

(52) U.S. Cl.
CPC ............. *H02M 3/158* (2013.01); *H02M 1/08* (2013.01); *H02M 1/14* (2013.01); *H02M 1/15* (2013.01);
(Continued)

(58) Field of Classification Search
CPC ........ H02M 1/44; H02M 3/156; H02M 3/158; H02M 3/157; H02M 3/33507; H02M 1/08;
(Continued)

(56) References Cited

U.S. PATENT DOCUMENTS

| | | | |
|---|---|---|---|
| 2006/0049815 A1* | 3/2006 | Ho ......................... | H02M 3/158 323/282 |
| 2006/0192537 A1* | 8/2006 | Hagen ...................... | G05F 1/70 323/222 |

(Continued)

FOREIGN PATENT DOCUMENTS

| | | |
|---|---|---|
| JP | 5576078 B2 | 8/2014 |
| JP | 2015-228761 A | 12/2015 |
| WO | 2015-186404 A1 | 12/2015 |

*Primary Examiner* — Gustavo A Rosario-Benitez
(74) *Attorney, Agent, or Firm* — White & Case LLP

(57) ABSTRACT

A switching power supply apparatus of each embodiment includes: a switch circuit configured to supply a pulse output to a load; a drive signal control circuit configured to perform ON/OFF driving operation of the switch circuit according to a duty ratio of a PWM signal; an error detection amplifier configured to compare output voltage supplied to the load and reference voltage and generate an error detection signal; a comparator configured to generate the PWM signal by comparison between a slope signal that starts level change in a cycle of the PWM signal and the error detection signal and give the PWM signal to the drive signal control circuit; and a spread spectrum correction circuit configured to generate an offset corresponding to the fluctuation of the cycle of the PWM signal and add the generated offset to the slope signal or the error detection signal.

9 Claims, 4 Drawing Sheets

(52) U.S. Cl.
CPC ............. *H02M 1/44* (2013.01); *H02M 3/157* (2013.01); *H02M 2001/0009* (2013.01); *H02M 2001/0025* (2013.01)

(58) Field of Classification Search
CPC .. H02M 1/14; H02M 2001/0009; H02M 1/42; H02M 1/4225; H02M 2001/0025
See application file for complete search history.

(56) References Cited

U.S. PATENT DOCUMENTS

| | | | | |
|---|---|---|---|---|
| 2008/0175029 | A1* | 7/2008 | Jung | H02M 3/156 363/79 |
| 2009/0309557 | A1* | 12/2009 | Miyamae | H02M 3/156 323/234 |
| 2013/0187624 | A1* | 7/2013 | Wakasugi | H02M 3/158 323/282 |
| 2013/0221936 | A1* | 8/2013 | Ku | H02M 1/4225 323/205 |
| 2014/0211526 | A1* | 7/2014 | Pidutti | H02M 1/4225 363/84 |
| 2015/0244269 | A1* | 8/2015 | Yu | H02M 3/156 323/284 |
| 2015/0263625 | A1* | 9/2015 | Lee | H02M 3/158 323/271 |
| 2015/0349639 | A1* | 12/2015 | Hosoyama | H02M 3/158 323/271 |
| 2016/0036852 | A1* | 2/2016 | Oliphant | G06F 21/57 726/23 |
| 2018/0062509 | A1* | 3/2018 | Duong | H02M 1/08 |

\* cited by examiner

SWITCHING POWER SUPPLY APPARATUS

This application is based upon and claims the benefit of priority from the prior Japanese Patent Applications No. 2017-182258, filed on Sep. 22, 2017; the entire contents of which are incorporated herein by reference.

FIELD

Embodiments described herein relate generally to a switching power supply apparatus.

BACKGROUND

Nowadays, with improvement of performance of electronic equipment mounted on a vehicle, a power source apparatus with high voltage accuracy of output is increasingly required. As such a vehicular power supply apparatus, a switching power supply apparatus may be adopted.

As one of countermeasures for electromagnetic interference (EMI) of the switching power supply, a spread spectrum scheme may be used.

There is, however, a problem that output ripple increases in spread spectrum operation.

DETAILED DESCRIPTION

A switching power supply apparatus of each embodiment is provided with: a switch circuit configured to supply a pulse output obtained from input voltage by switching to a load via an output coil and an output capacitor; a drive signal control circuit configured to perform ON/OFF driving operation of the switch circuit according to a duty ratio of a PWM signal; an error detection amplifier configured to compare output voltage supplied to the load and reference voltage and generate an error detection signal; a comparator configured to generate the PWM signal by comparison between a slope signal that starts level change in a cycle of the PWM signal and the error detection signal and give the PWM signal to the drive signal control circuit; a control portion configured to cause the cycle of the PWM signal to fluctuate for spread spectrum; and a spread spectrum correction circuit configured to generate an offset corresponding to the fluctuation of the cycle of the PWM signal and add the generated offset to the slope signal or the error detection signal.

Embodiments of the present invention will be described below in detail with reference to drawings.

First Embodiment

Figure 1:
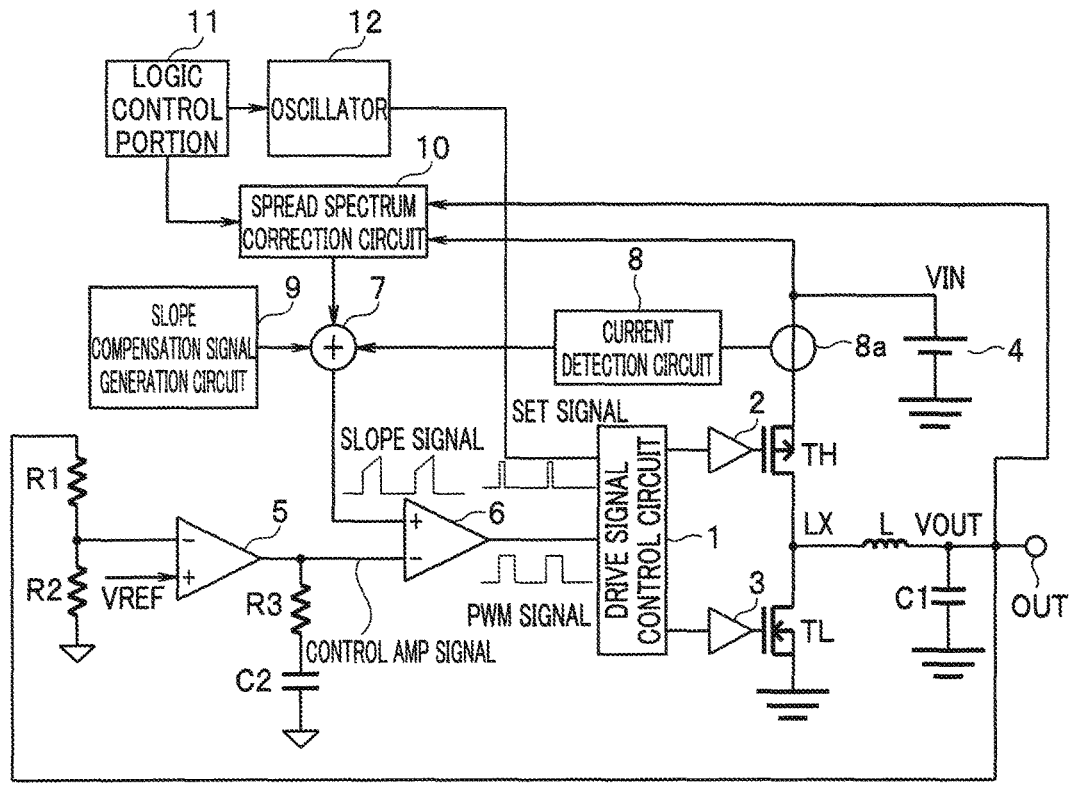
FIG. 1 is a circuit diagram showing a switching power supply apparatus according to a first embodiment of the present invention.
Figure 2:
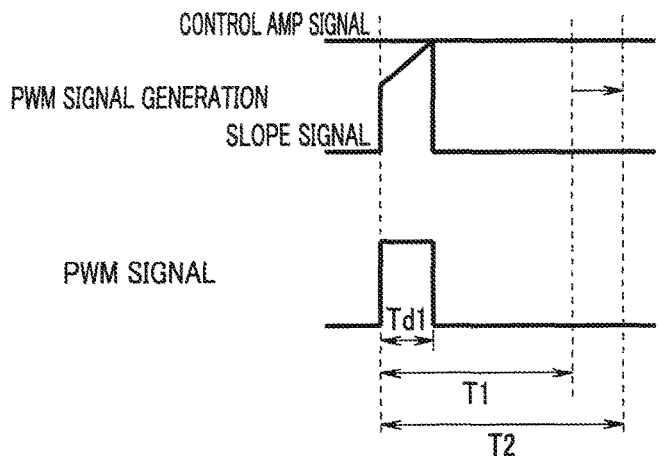
FIG. 2 is a diagram for illustrating a problem occurring at a time when spectrum spreading is performed in a switching power supply apparatus according to a related-art technique.
Figure 3:
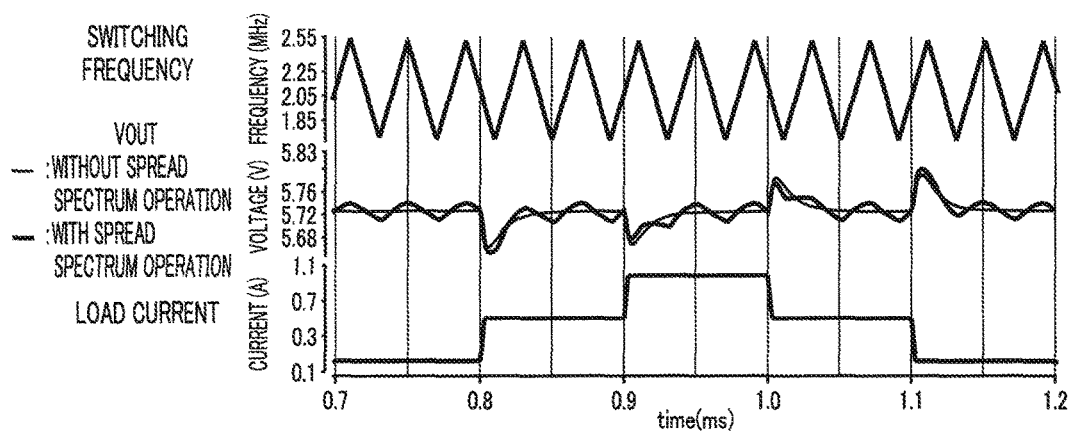
FIG. 3 is a diagram for illustrating the problem occurring at a time when spectrum spreading is performed in the switching power supply apparatus according to the related-art technique.

FIG. 1 is a circuit diagram showing a switching power supply apparatus according to a first embodiment of the present invention. Further, FIGS. 2 and 3 are diagrams for illustrating a problem occurring at a time when spectrum spreading is performed in a switching power supply apparatus according to a related-art technique.

First, description will be made on a problem in a case where spectrum spreading is performed as an EMI countermeasure for high-speed switching with reference to FIGS. 2 and 3.

Noise standards for on-vehicle products are strict in comparison with those for consumer products, and, moreover, it is also required that noise be not included in AM radio sound. Therefore, a switching power supply apparatus is required to perform switching operation at a high frequency equal to or higher than an AM radio frequency. Since such high-speed switching further causes high-frequency noise, the switching power supply apparatus requires a lot of measures/parts according to the EMI standards.

A spread spectrum scheme may be used as one of the EMI countermeasures. Spread spectrum in the switching power supply apparatus changes a switching frequency within a predetermined range. Thereby, it is possible to cause energy of switching noise to be dispersed without causing the energy to be concentrated on a fixed frequency, and it is possible to decrease a noise peak value to reduce influence by the switching noise.

When a switching frequency is caused to fluctuate, however, a duty ratio of switching fluctuates, and output ripple increases as a result. FIG. 2 shows a control AMP signal obtained by feedback of output voltage and a slope signal obtained by feedback of a coil current in a control loop of a common step-down DCDC converter for current mode control. In the common step-down DCDC converter for current mode control, a current is supplied to a load until a level of the slope signal reaches a level of the control AMP signal, that is, during a period in which a PWM signal in FIG. 2 is at a high level (an H level).

When a switching cycle is T1 in FIG. 2, a duty ratio of the PWM signal is indicated by Td1/T1. When the switching cycle is 12 in FIG. 2, the duty ratio of the PWM signal is indicated by Td1/T2. When the duty ratio of the PWM signal and input voltage are indicated by Duty and Vin, respectively, output voltage Vout of the step-down DCDC converter is indicated by a following equation:

$$V\text{out} = \text{Duty} \times V\text{in}$$

Now, it is assumed that the switching frequency fluctuates due to spread spectrum operation, and the switching cycle T1 changes to T2. Though the output voltage Vout also changes due to the change in the switching cycle, change in the control AMP signal obtained by feedback of output voltage is slow relative to the change in the switching cycle. Therefore, even if the switching frequency changes, the level of the control AMP signal keeps a level before the fluctuation of the frequency. Therefore, a pulse width Td1 of the PWM signal does not change, and only the switching cycle changes. As a result, the duty ratio changes in response to the change in the switching frequency.

That is, if the switching frequency becomes low, the duty ratio becomes small, and the output voltage Vout decreases. On the contrary, if the switching frequency becomes high, the duty ratio becomes large, and the output voltage Vout increases. Therefore, when spread spectrum operation is performed, the output voltage Vout increases and decreases, and ripple increases.

FIG. 3 shows an output ripple waveform in the case where spread spectrum operation is performed by the related-art technique. An upper part of FIG. 3 shows change in a switching frequency, and a lower part shows an example in a case where a load current fluctuates. A middle part of FIG. 3 shows, by a thin line, output voltage VOUT in the case of not performing the spread spectrum operation and shows, by a thick line, the output voltage VOUT in the case of performing the spread spectrum operation. From FIG. 3, it is seen that the output ripple waveform at a time when the spread operation is performed is larger than the case where the operation is not performed. Influence of output ripple is a problem especially in a case where high accuracy is required as output voltage accuracy or in a case where input voltage fluctuation of a device connected to output is susceptible.

In the present embodiment, occurrence of ripple by frequency fluctuation is prevented by providing an offset corresponding to fluctuation of the switching frequency for a slope signal.

In FIG. 1, a power source 4 generates power source voltage VIN. The power source 4 is connected to a reference potential point via a source/drain path of a high-side transistor TH and a source/drain path of a low-side transistor TL. A node LX to which a drain of the transistor TH and a drain of the transistor TL are connected is connected to an output terminal OUT via an output coil L. Between the output terminal OUT and a reference potential point, an output capacitor C1 is connected.

During an ON period of the transistor TH, a current flows through the output coil L from the power source 4 via the transistor TH. Thereby, the output capacitor C1 is charged while energy is being accumulated in the output coil L, and a load connected to the output terminal OUT is driven. The output voltage VOUT appearing at the output terminal OUT is smoothed by the output capacitor C1 and becomes a voltage value according to each of ON time periods of the transistors TH and TL which are switch circuits.

ON/OFF of the transistors TH and TL are controlled by a drive signal control circuit 1. The drive signal control circuit 1 is supplied with a set signal from an oscillator 12 and supplied with a PWM signal from a comparator 6 to be described later. Oscillation of the oscillator 12 is controlled by a logic control portion 11.

The logic control portion 11 is adapted to be capable of controlling an oscillation frequency of the oscillator 12. The logic control portion 11 is adapted to set the oscillation frequency of the oscillator 12 to a predetermined oscillation frequency and cause the oscillation frequency to fluctuate for spread spectrum operation. The oscillator 12 is controlled by the logic control portion 11 to supply a pulse signal with a specified oscillation frequency to the drive signal control circuit 1 as a set signal. Therefore, the set signal is the pulse signal in the cycle specified by the logic control portion 11, and the cycle is caused to fluctuate by spread spectrum operation. The cycle of the set signal becomes a switching cycle.

The drive signal control circuit 1 is adapted to turn on the transistor TH and turn off the transistor TL at a rising timing of the set signal. In order to decide a timing of turning off the transistor TH and a timing of turning on the transistor TL, two control loops are configured.

The output terminal OUT is connected to a reference potential point via resistors R1 and R2 for feeding back the output voltage VOUT. A connection point between the resistors R1 and R2 constituting a voltage control loop is connected to an inverting input end of an error detection amplifier 5. Reference voltage VREF is applied to a non-inverting input end of the error detection amplifier 5. The error detection amplifier 5 compares a divided voltage value of the output voltage VOUT divided by the resistors R1 and R2 with the reference voltage VREF and outputs a difference value. An output end of the error detection amplifier 5 is connected to a reference potential point via a phase compensation circuit configured by a resistor R3 and a capacitor C2. The difference value from the error detection amplifier 5 is given to an inverting input end of the comparator 6 as a control AMP signal which is an error detection signal.

A coil current which flows through a source of the transistor TH is supplied to a current detection circuit 8 via a current transformer 8a. The current detection circuit 8 detects the coil current via the current transformer 8a. The current detection circuit 8 constitutes a current control loop for feeding back the coil current, and a detection result of the current detection circuit 8 is supplied to an adder 7. An output of a slope compensation signal generation circuit 9 is also given to the adder 7. The slope compensation signal generation circuit 9 generates a slope compensation signal for preventing the output voltage VOUT from not converging because of subharmonic oscillation. The compensation signal from the slope compensation signal generation circuit 9 is given to the adder 7. The adder 7 generates a slope signal which has been slope-compensated, by adding the compensation signal from the slope compensation signal generation circuit 9 to the coil current from the current detection circuit 8.

In the present embodiment, an offset correction signal from a spread spectrum correction circuit 10 to be described later is also given to the adder 7. The adder 7 is adapted to add or subtract corrected voltage ΔV based on an offset correction signal from the spread spectrum correction circuit 10 to or from the slope-compensated slop signal to correct an amount of offset for the slope signal and, after that, supply a result to a non-inverting input end of the comparator 6.

In the present embodiment, control is performed so that, even if the switching frequency is caused to fluctuate, it is avoided that the duty ratio of the PWM signal changes due to influence of the fluctuation. That is, an input of the comparator 6 is corrected according to change in the switching frequency. For example, if an inclination of the slope signal is constant, control in which the duty ratio of the PWM signal does not change even if the switching frequency fluctuates is possible, by causing the amount of offset for the slope signal to change by an amount corresponding to fluctuation of the switching cycle. When an inclination of the coil current, a voltage conversion gain of the current detection circuit and a slope compensation inclination are indicated by S, GiV and Se, respectively, and it is assumed that the switching cycle changes from T1 to T2, the corrected voltage ΔV, which is the amount of offset, is given by Equation (1) below.

$$\Delta V = (VOUT/VIN) \times (T2-T) \times GiV \times (S+Se) \qquad (1)$$

Note that S=(VIN−VOUT)/L is assumed.

The spread spectrum correction circuit 10 acquires values of the switching cycles T1 and T2, and values of an inductance L of the output coil L, the conversion gain GiV and the slope compensation inclination Se from the logic control portion 11. The inclination S of the coil current can be obtained from VIN, VOUT and L, and the spread spectrum correction circuit 10 determines and outputs an offset correction signal in accordance with Equation (1) above. Note that the spread spectrum correction circuit 10 may generate the corrected voltage ΔV of Equation (1) above as the offset correction signal, or may be configured with a current source to generate a current to obtain a voltage value corresponding to Equation (1) above and supply the current to the adder 7.

Note that actual supply of VOUT to the spread spectrum correction circuit 10 may be omitted on an assumption that VOUT does not fluctuate relatively largely, and a specified value of VOUT may be given to the spread spectrum correction circuit 10 from the logic control portion 11.

That is, when an already-known value is used as VOUT, the spread spectrum correction circuit 10 performs feed forward control to generate an offset correction signal using an already-known value from the logic control portion 11. In this case, highly accurate control is possible without considering operation delay and the like. Note that, as for VIN also, if VIN is assumed to be a fixed and already-known voltage value, actual supply of VIN to the spread spectrum correction circuit 10 may be omitted, and a specified value of VIN may be supplied from the logic control portion 11 to the spread spectrum correction circuit 10.

The comparator 6 compares two inputs and generates a PWM signal of a comparison result. That is, the comparator 6 generates a PWM signal which is at the H level during a period from a rising time of a slope signal to a time when a level of the slope signal reaches a level of a control AMP signal and is at a low level (hereinafter referred to as an L level) during other periods and outputs the PWM signal to the drive signal control circuit 1. Note that a rising timing of the slope signal corresponds to a rising timing of a set signal.

The drive signal control circuit 1 generates a drive signal which turns on the transistor TH and turns off the transistor TL at the rising timing of the set signal and which turns off the transistor TH and turns on the transistor TL at a falling timing of the PWM signal. The drive signal from the drive signal control circuit 1 is supplied to a gate of the transistor TH via a buffer 2 and supplied to the transistor TL via a buffer 3.

Figure 4:
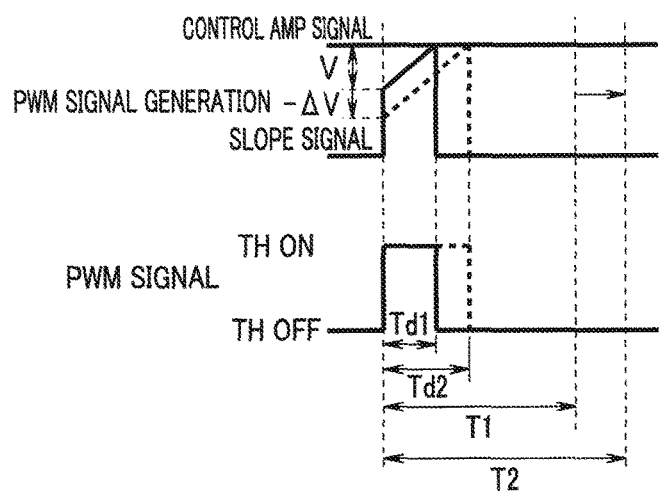
FIG. 4 is a diagram for illustrating operation of the first embodiment.
Figure 5:
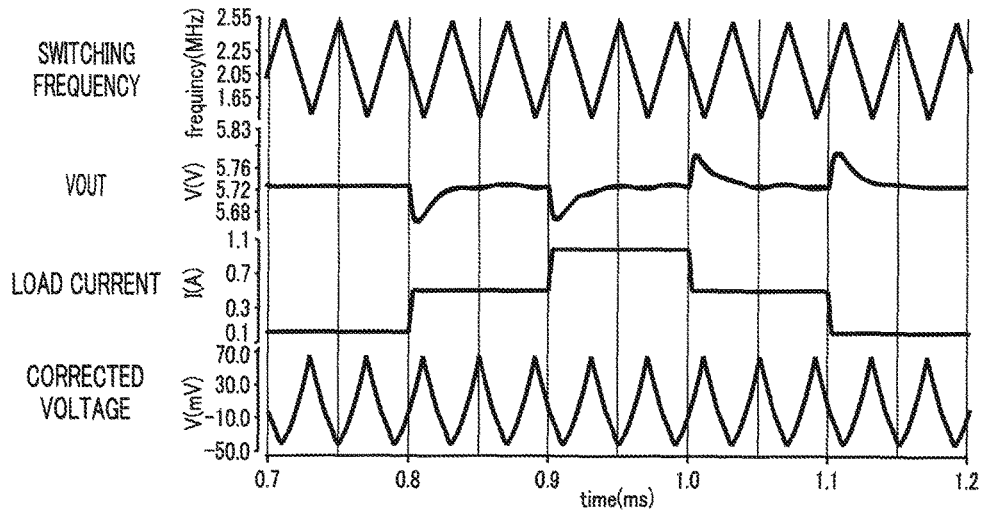
FIG. 5 is a diagram showing an effect of the first embodiment.

Next, operation of the embodiment configured as described above will be described with reference to FIGS. 4 and 5. FIG. 4 is a diagram for illustrating the operation of the first embodiment. Further, FIG. 5 is a diagram showing an effect of the first embodiment.

The logic control portion 11 specifies an oscillation frequency (a switching frequency) to the oscillator 12. The oscillator 12 generates a set signal with the oscillation frequency specified by the logic control portion 11 and supplies the set signal to the drive signal control circuit 1. The drive signal control circuit 1 is also given a PWM signal which rises in synchronization with the set signal, from the comparator 6, and the drive signal control circuit 1 gives a set output to turn on the transistor TH and turn off the transistor TL at a rising timing of the set signal to the transistors TH and TL via the buffers 2 and 3. Thereby, a current flows through the output coil L from the power source 4 via the transistor TH and the output capacitor C1 is charged. The drive signal control circuit 1 gives a reset output to turn off the transistor TH and turn on the transistor TL at a falling timing of the PWM signal to the transistors TH and TL via the buffers 2 and 3. In this way, voltage corresponding to each of the ON time periods of the transistors TH and TL is smoothed by the output capacitor C1, and output voltage VOUT is supplied to a load via the output terminal OUT.

The output voltage VOUT is divided by the resistors R1 and R2 and fed back. The error detection amplifier 5 detects a difference between the divided voltage by the resistors R1 and R2 and the reference voltage VREF and gives the difference to the inverting input end of the comparator 6 as a control AMP signal. A level of the control AMP signal decreases as the output voltage VOUT increases, and increases as the output voltage VOUT decreases.

On the other hand, a coil current is fed back by the current detection circuit 8. The current detection circuit 8 detects a coil current and generates a slope signal with an inclination corresponding to the coil current. The slope compensation signal generation circuit 9 generates a slope compensation signal, and the adder 7 compensates the inclination of the slope signal from the current detection circuit 8 with the slope compensation signal.

In the present embodiment, the spread spectrum correction circuit 10 has generated an offset correction signal, and the adder 7 gives an offset corresponding to corrected voltage based on the offset correction signal to the slope-compensated slope signal. The slope signal from the adder 7 is supplied to the non-inverting input end of the comparator 6.

The comparator 6 performs comparison between the control AMP signal and the slope signal, and a PWM signal, which is at the H level during a period from a rising time of the slope signal to a time when the slope signal reaches the level of the control AMP signal, is outputted from the comparator 6. If the output voltage VOUT decreases due to increase in a load current or the like, the level of the control AMP signal increases and the control AMP signal acts to increase a duty ratio of the PWM signal. Thereby, the ON period of the transistor TH and an OFF period of the transistor TL are lengthened, and the output VOUT increases. On the contrary, when the output voltage VOUT increases, the level of the control AMP signal decreases, and the control AMP signal acts to decrease the duty ratio of the PWM signal. Thereby, the ON period of the transistor TH and the OFF period of the transistor TL are shortened, and the output VOUT decreases. In this way, it is possible to cause the output voltage VOUT to be constant by a voltage control loop.

On the other hand, in the current control loop, the PWM signal at the H level is caused to be outputted during the period in which the slope signal based on the coil current reaches the level of the control AMP signal. For example, when the output voltage VOUT decreases and the coil current increases, an action is performed so that an inclination of the slope signal increases and a duty ratio of the PWM signal is decreased. Thereby, the ON period of the transistor TH and the OFF period of the transistor TL are shortened, and the coil current is caused to decrease. On the contrary, when the output voltage VOUT increases and the coil current decreases, an action is performed so that the inclination of the slope signal decreases and the duty ratio of the PWM signal is increased. Thereby, the ON period of the transistor TH and the OFF period of the transistor TL are lengthened, and the coil current is caused to increase. In this way, it is possible to cause the coil current to be constant by the current control loop.

In spread spectrum operation, the logic control portion 11 causes the oscillator 12 to make an oscillation frequency fluctuate. Now, it is assumed that a cycle of a set signal in a case where the oscillator 12 oscillates at a lowest oscillation frequency f1 is T1, and a cycle of the set signal in a case where the oscillator 12 oscillates at an oscillation frequency f2 is T2. Waveforms at an upper part of FIG. 4 indicate, by solid lines, a slope signal outputted from the adder 7 and a control AMP signal outputted from the error detection amplifier 5 when the switching cycle is T1. Note that a broken line at the upper part of FIG. 4 shows a case where the switching cycle is T2.

The comparator 6 generates a PWM signal which is at the H level during a period from a rising time of the slope signal to a time when the slope signal reaches the control AMP signal. A solid line at a lower part of FIG. 4 indicates the PWM signal in a case where the switching cycle is T1, and an H period is indicated by Td1. Note that it is assumed that an H-level period of the PWM signal (a broken line) in a case where the switching cycle is T2 is indicated by Td2. Duty ratios of the PWM signals during periods in which frequencies of the set signal are f1 and f2 are indicated by Td1/T1 and Td2/T2, respectively.

Here, it is assumed that the frequency of the oscillator 12 changes from f1 to f2 by the spread spectrum operation. The corrected voltage ΔV based on Equation (1) above is obtained by the spread spectrum correction circuit 10.

In FIG. 4, it is assumed that the inclination of the slope signal and the duty ratio Td1/T at the cycle T1 are indicated by α and β, respectively. Here, Td1=β·T1 is satisfied, and an amount V of level that changes until the slope signal reaches the control AMP signal in the cycle T1 is indicated by Equation (2) below:

$$V = \alpha \cdot Td1 = \alpha \cdot \beta \cdot T1 \quad (2)$$

Further, V+ΔV=α·Td2 and Td2=(V+ΔV)/α are satisfied. When Equation (2) above is substituted into the equation, Equation (3) below is obtained.

$$Td2 = (\alpha \cdot \beta \cdot T1 + \Delta V)\alpha \quad (3)$$

Equation (1) above shows that the corrected voltage ΔV is obtained as a product of the duty ratio and the inclination of the slope signal (T2-T1), and Equation (4) below is obtained by transforming Equation (3).

$$Td2 = \{\alpha \cdot \beta \cdot T1 + \alpha \cdot \beta(T2-T1)\}/\alpha = \beta \cdot T2 \quad (4)$$

That is, Equation (4) shows that Td2/T2=β(=Td1/T1) is satisfied and shows that, if the output voltage VOUT does not change and each term of Equation (1) above excluding the cycles T1 and T2 does not change, the duty ratio is constant irrespective of change in the cycle.

FIG. 5 corresponds to FIG. 3, and shows relationships among the switching frequency, the output voltage VOUT, the load current and the corrected voltage in the present embodiment. As shown in FIG. 5, a switching frequency fluctuates due to spread spectrum operation. Corrected voltage in FIG. 5 is based on an offset correction signal of the spread spectrum correction circuit 10, and changes according to change in the switching frequency (cycle) in accordance with Equation (1) above.

As a result of an offset based on the offset correction signal being given to a slope signal, an H-level period of a PWM signal changes according to fluctuation of a switching frequency, and, consequently, a duty ratio of the PWM signal does not change by the fluctuation of the switching frequency. Since output voltage VOUT is obtained as a product of the duty ratio of the PWM signal and input voltage VIN, it is possible to obtain the stable output voltage VOUT with little ripple irrespective of fluctuation of the switching frequency.

Note that, though FIG. 5 shows an example in which the output voltage VOUT slightly changes at a point of change in a load current, ripple due to influence of fluctuation of the switching frequency has been certainly removed as apparent from comparison with FIG. 3.

Thus, in the present embodiment, an amount of offset for a slope signal is caused to change by an amount of fluctuation of a switching cycle, and control in which a duty ratio of a PWM signal does not change even if a switching frequency fluctuates is possible. Thereby, even if spread spectrum operation is performed as an EMI countermeasure, occurrence of ripple is suppressed and stable output voltage can be obtained.

Second Embodiment

Figure 6:
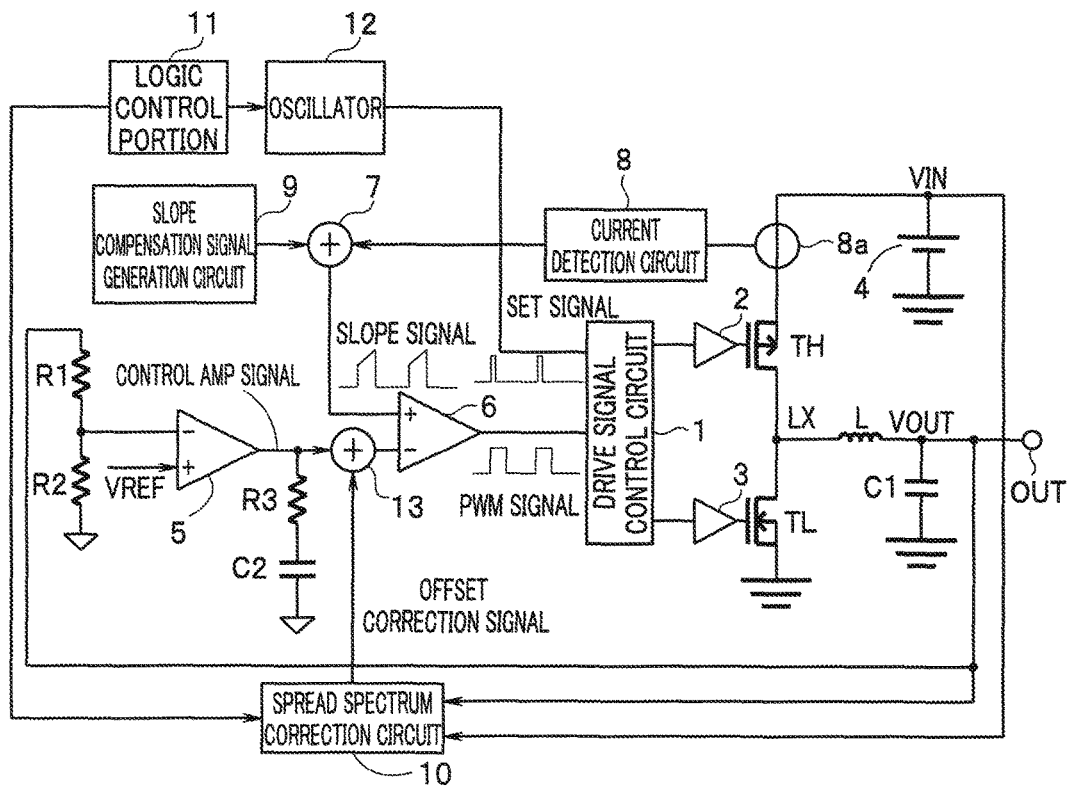
FIG. 6 is a block diagram showing a second embodiment of the present invention.

FIG. 6 is a block diagram showing a second embodiment of the present invention. In FIG. 6, the same components as those in FIG. 1 are given the same reference numerals, and description of the components will be omitted.

Though the first embodiment shows an example of causing an offset for a slope signal to change according to change in a switching cycle, the present embodiment is for causing an offset for a control AMP signal to change according to change in the switching cycle.

In the present embodiment, a control AMP signal generated by the error detection amplifier 5 is supplied to the inverting input end of the comparator 6 via an adder 13, and an offset correction signal from the spread spectrum correction circuit 10 is given to the adder 13 instead of the adder 7. The adder 13 is adapted to add or subtract the offset correction signal from the spread spectrum correction circuit 10 to or from the inputted control AMP signal and give a result to the comparator 6.

Figure 7:
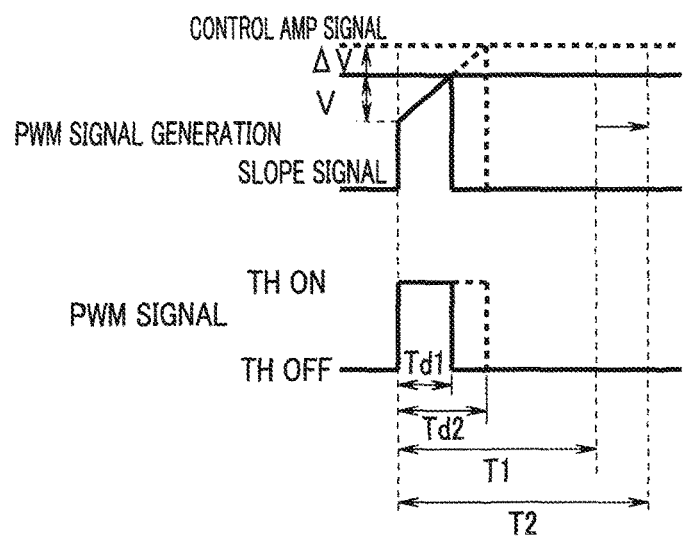
FIG. 7 is a diagram for illustrating operation of the second embodiment.
Figure 8:
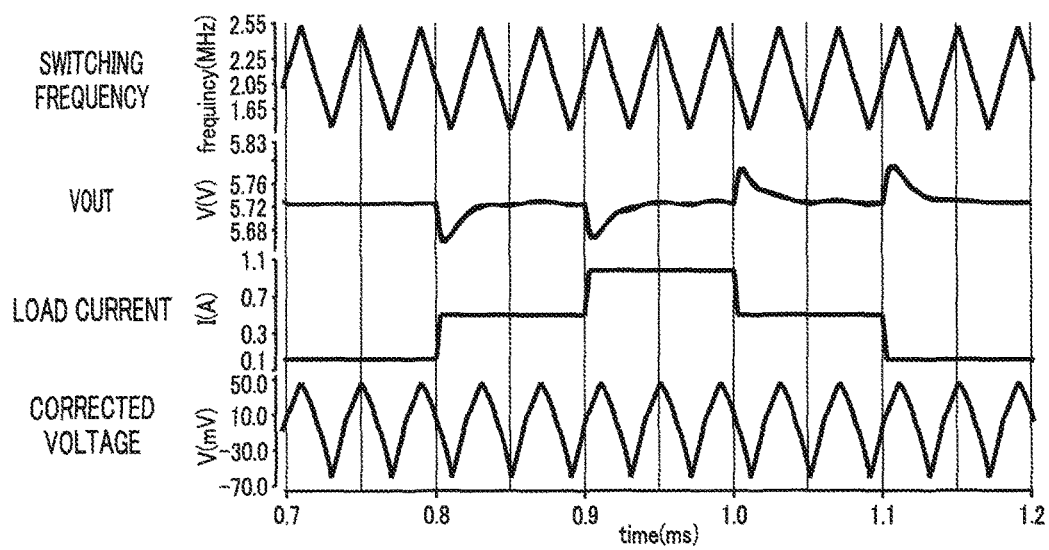
FIG. 8 is a diagram showing an effect of the second embodiment.

Next, operation of the embodiment configured as described above will be described with reference to FIGS. 7 and 8. FIG. 7 is a diagram for illustrating operation of the second embodiment. Further, FIG. 8 is a diagram showing an effect of the second embodiment.

The adder 7 generates a slope signal which has been slope-compensated, by adding a compensation signal from the slope compensation signal generation circuit 9 to a coil current from the current detection circuit 8. The slope signal is supplied to the non-inverting input end of the comparator 6.

The adder 13 adds or subtracts corrected voltage ΔV based on an offset correction signal from the spread spectrum correction circuit 10 to or from a control AMP signal from the error detection amplifier 5, and supplies the offset-corrected control AMP signal to the inverting input end of the comparator 6. Note that, in the present embodiment also, the spread spectrum correction circuit 10 generates an offset correction signal in accordance with Equation (1) above.

Now, it is assumed that a cycle of a set signal in a case where the oscillator 12 oscillates at the lowest oscillation frequency f1 in spread spectrum operation is T1, and a cycle of the set signal in a case where the oscillator 12 oscillates at an oscillation frequency f2 is T2. Waveforms at an upper part of FIG. 7 indicate, by solid lines, a slope signal outputted from the adder 7 and a control AMP signal outputted from the error detection amplifier 5 when a switching cycle is T1. Note that a broken line at the upper part of FIG. 7 indicates the control AMP signal in a case where the switching cycle is T2.

A solid line at a lower part of FIG. 7 indicates a PWM signal in a case where the switching cycle is T1, and an H period is indicated by Td1. Note that it is assumed that an H-level period of the PWM signal (a broken line) in a case where the switching cycle is T2 is indicated by Td2. Duty ratios of the PWM signals during periods in which frequencies of the set signal are f1 and f2 are indicated by Td1/T1 and Td2/T2, respectively.

Here, it is assumed that the frequency of the oscillator 12 changes from f1 to f2 by the spread spectrum operation. The corrected voltage ΔV based on Equation (1) above is obtained by the spread spectrum correction circuit 10.

In FIG. 7, it is assumed that the inclination of the slope signal and the duty ratio Td1/T1 in the cycle T1 are indicated by α and β, respectively. Then, in the present embodiment also, Equations (2) to (4) above are satisfied.

That is, Equation (4) shows that Td2/T2=β(=Td1/T1) is satisfied and shows that, if the output voltage VOUT does not change and each term of Equation (1) above excluding the cycles T1 and T2 does not change, the duty ratio is constant irrespective of change in the cycle.

FIG. 8 corresponds to FIG. 3, and shows relationships among the switching frequency, the output voltage VOUT, the load current and the corrected voltage in the present embodiment. As shown in FIG. 8, a switching frequency fluctuates due to spread spectrum operation. Corrected voltage in FIG. 8 is based on an offset correction signal of the spread spectrum correction circuit 10, and changes according to change in the switching frequency (cycle) in accordance with Equation (1) above.

As a result of an offset based on the offset correction signal being given to a control AMP signal, an H-level period of a PWM signal changes according to fluctuation of a switching frequency, and, consequently, a duty ratio of the PWM signal does not change by the fluctuation of the switching frequency. Since the output voltage VOUT is obtained as a product of the duty ratio of the PWM signal and input voltage VIN, it is possible to obtain the stable output voltage VOUT with little ripple irrespective of fluctuation of the switching frequency.

Note that, though FIG. 8 shows an example in which the output voltage VOUT slightly changes at a point of change in a load current, ripple has been certainly removed due to influence of fluctuation of the switching frequency as apparent from comparison with FIG. 3.

Thus, in the present embodiment also, an effect similar to the effect of the first embodiment is obtained.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A switching power supply apparatus comprising:
   a switch circuit configured to supply a pulse output obtained from an input voltage by switching to a load via an output coil and an output capacitor;
   a drive signal control circuit configured to perform ON/OFF driving operation of the switch circuit according to a duty ratio of a PWM signal;
   an error detection amplifier configured to compare an output voltage supplied to the load and reference voltage and generate an error detection signal;
   a comparator configured to generate the PWM signal by comparison between a slope signal that starts level change in a cycle of the PWM signal and the error detection signal and give the PWM signal to the drive signal control circuit;
   a control portion configured to cause the cycle of the PWM signal to fluctuate for spread spectrum; and
   a spread spectrum correction circuit configured to generate an offset to be added to the slope signal or the error detection signal, based on a multiplying operation for multiplying an inclination of the slope signal and a difference between the cycle of the PWM signal before the fluctuation and the cycle of the PWM signal after the fluctuation.

2. The switching power supply apparatus according to claim 1, further comprising:
   a current detection circuit configured to detect a coil current that flows through the output coil; and
   a first adder configured to add the offset to the slope signal based on the coil current detected by the current detection circuit, and output the slope signal to which the offset is added.

3. The switching power supply apparatus according to claim 2, further comprising a slope compensation signal generation circuit configured to give a slope compensation signal for prevention of subharmonic oscillation to the first adder.

4. The switching power supply apparatus according to claim 1, further comprising a second adder configured to add the offset to the error detection signal from the error detection amplifier and give a result to the comparator.

5. The switching power supply apparatus according to claim 4, further comprising:
   a current detection circuit configured to detect a coil current that flows through the output coil; and
   a slope compensation circuit configured to generate a slope compensation signal for prevention of subharmonic oscillation that is to be added to the slope signal based on the coil current detected by the current detection circuit.

6. The switching power supply apparatus according to claim 1, wherein the spread spectrum correction circuit determines the offset based on the input voltage, the output voltage and inductance of the output coil.

7. The switching power supply apparatus according to claim 6, wherein the spread spectrum correction circuit measures a value of the input voltage and acquires values of the output voltage and the output coil from the control portion.

8. The switching power supply apparatus according to claim 6, wherein the spread spectrum correction circuit acquires the values of the input voltage, the output voltage and the output coil from the control portion.

9. The switching power supply apparatus according to claim 1, wherein the drive signal control circuit generates a drive signal for performing ON/OFF driving operation of the switch circuit based on a set signal in the cycle of the PWM signal and the PWM signal.

* * * * *